US007783979B1

(12) United States Patent
Leblang et al.

(10) Patent No.: US 7,783,979 B1
(45) Date of Patent: Aug. 24, 2010

(54) METHODS AND APPARATUS FOR GENERATION AND EXECUTION OF CONFIGURABLE BOOKMARKS

(75) Inventors: Jonathan Leblang, Menlo Park, CA (US); Matthew W. Amacker, San Jose, CA (US)

(73) Assignee: A9.com, Inc., Palo Alto, CA (US)

( * ) Notice: Subject to any disclaimer, the term of this patent is extended or adjusted under 35 U.S.C. 154(b) by 1360 days.

(21) Appl. No.: 11/097,362

(22) Filed: Mar. 31, 2005

Related U.S. Application Data

(60) Provisional application No. 60/610,160, filed on Sep. 14, 2004.

(51) Int. Cl.
G06F 3/00 (2006.01)

(52) U.S. Cl. .................. 715/739; 715/738; 715/745; 709/203; 709/218; 709/227

(58) Field of Classification Search .............. 715/745, 715/738, 739; 709/203, 217, 218, 223–229, 709/245
See application file for complete search history.

(56) References Cited

U.S. PATENT DOCUMENTS

| 6,100,890 | A | * | 8/2000 | Bates et al. ............... 715/826 |
| 6,182,113 | B1 | * | 1/2001 | Narayanaswami .......... 709/203 |
| 6,321,262 | B1 | * | 11/2001 | Springer ................... 709/223 |
| 6,460,038 | B1 |   | 10/2002 | Khan et al. |
| 6,526,424 | B2 | * | 2/2003 | Kanno et al. .............. 715/229 |
| 6,535,912 | B1 | * | 3/2003 | Anupam et al. ............ 709/217 |
| 6,549,217 | B1 | * | 4/2003 | De Greef et al. ........... 715/745 |
| 6,725,227 | B1 | * | 4/2004 | Li .......................... 707/102 |
| 7,051,117 | B2 | * | 5/2006 | McGee et al. .............. 709/245 |
| 7,346,703 | B2 | * | 3/2008 | Cope ....................... 709/238 |
| 2002/0116411 | A1 | * | 8/2002 | Peters et al. ............ 707/501.1 |
| 2002/0120527 | A1 | * | 8/2002 | Lam et al. ................. 705/26 |
| 2002/0143861 | A1 | * | 10/2002 | Greene et al. ............. 709/203 |
| 2002/0156832 | A1 | * | 10/2002 | Duri et al. ................. 709/203 |
| 2002/0178213 | A1 | * | 11/2002 | Parry ....................... 709/203 |
| 2003/0005041 | A1 | * | 1/2003 | Ullmann et al. ........... 709/203 |
| 2003/0144984 | A1 | * | 7/2003 | Dunbar ..................... 707/1 |
| 2003/0177265 | A1 | * | 9/2003 | Page et al. ................. 709/245 |
| 2003/0225891 | A1 | * | 12/2003 | Stienhans .................. 709/227 |
| 2004/0034637 | A1 | * | 2/2004 | Riche et al. ................ 707/9 |
| 2004/0098493 | A1 | * | 5/2004 | Rees ........................ 709/229 |
| 2004/0193676 | A1 | * | 9/2004 | Marks ....................... 709/203 |
| 2004/0193699 | A1 | * | 9/2004 | Heymann et al. .......... 709/218 |
| 2005/0114756 | A1 | * | 5/2005 | Lehikoinen et al. ...... 715/501.1 |

(Continued)

OTHER PUBLICATIONS

Yehuda Shiran and Tomer Shiran in "Javascript/col. 35: Bookmarklets," with an archived publish date of Nov. 18, 1999, by internet.com LLC, currently available at www.webreference.com/js/column35/index.html, published by.*

(Continued)

*Primary Examiner*—Ba Huynh
(74) *Attorney, Agent, or Firm*—Townsend and Townsend and Crew LLP

(57) ABSTRACT

Methods and apparatus for configuring a bookmark are disclosed. A bookmark is configured such that the bookmark has one or more variables and/or one or more commands associated therewith. A value is dynamically substituted for each variable of the bookmark. The bookmark is then executed such that any command(s) of the bookmark are executed.

27 Claims, 8 Drawing Sheets

U.S. PATENT DOCUMENTS

| | | | |
|---|---|---|---|
| 2005/0198307 A1* | 9/2005 | Zoller et al. | 709/227 |
| 2005/0204292 A1* | 9/2005 | Kibilov et al. | 715/738 |
| 2006/0015504 A1* | 1/2006 | Yu et al. | 707/10 |
| 2006/0041635 A1* | 2/2006 | Alexander et al. | 709/218 |
| 2006/0059231 A1* | 3/2006 | Takatori et al. | 709/206 |
| 2007/0168192 A1* | 7/2007 | Peuziat et al. | 704/260 |
| 2007/0203804 A1* | 8/2007 | Kargman | 705/26 |
| 2008/0172396 A1* | 7/2008 | Banerjee et al. | 707/10 |
| 2008/0281899 A1* | 11/2008 | Chan et al. | 709/201 |
| 2009/0083421 A1* | 3/2009 | Glommen et al. | 709/224 |

OTHER PUBLICATIONS

Matthew Lock, "Wayback Machine Bookmarklet—Industrial Hypertext," with archived results providing a publish date of Aug. 4, 2002, http://web.archive.org/web/20070304053812/members.iinet.net.au/~iht/articles/wayback_bookmarklet.shtml.*

David Flanagan, JavaScript Pocket Reference, 2nd Edition, published by O'Reilly & Associates Inc., Oct. 2002.*

"Bookmarklets: more, useful bookmarklets," located at dooyoo-uk.tripod.com/bookmarklets2.html with an archived date of Oct. 1, 2002.*

Jerry Lee Ford, Jr., "Learn Javascript in a Weekend," published Jan. 1, 2003, Premier Press.*

Steve Kangas, "About Bookmarklets," Created: Aug. 20, 2003; Accessed Nov. 7, 2007. http://web.archive.org/web/20030802083243/http://www.bookmarklets.com/about/.*

"How Cool are Custom Keywords", Asa Dotzer, Feb. 10, 2001, p. 1-2.*

"Writing embeded-date bookmarklets", Jorn Barger, Aug. 17, 2000, pp. 1-9.*

"Aligning Security and Usability", Ka-Ping Yee, IEEE Computer Society Oct. 2004, pp. 48-55.*

"Specifying username/password in a URL", (Rutgers) Mar. 12, 2004. p. 1.*

"Driss-A-Blog: Easier Goole cache hacking", Dec. 16, 2004, pp. 1-3.*

"URI Encoder," Oct. 14, 2005, <http://www.andrewu.co.uk /tools/uriencoder/default.asp> [retrieved Feb. 14, 2006], 2 pages.

"Wayback Machine," *Internet Archive*, Mar. 10, 2001, <http://www.archive.org> [retrieved Feb. 2, 2006], 2 pages.

* cited by examiner

| | |
|---|---|
| 2 | *http://www.bb-rv.com/rentals.html* |
| 4 | *www.archive.org* |
| 6 | *http://www.andrewu.co.uk/tools/uriencoder/default.asp* |
| 8 | *www.bb-rv.com* |
| 10 | *www.Webopedia.com* |
| 12 | *http://web.archive.org/web/\*/[:URL:]]* |
| 14 | *http://web.archive.org/web/\*/* |
| 16 | *http://news.yahoo.com/* |

METHODS AND APPARATUS FOR GENERATION AND EXECUTION OF CONFIGURABLE BOOKMARKS

CROSS REFERENCE TO RELATED APPLICATIONS

This application claims the priority of Provisional Application No. 60/610,160, filed Sep. 14, 2004, which is incorporated herein by reference in its entirety.

BACKGROUND OF THE INVENTION

1. Field of the Invention

The present invention relates to methods and apparatus for generation and execution of configurable bookmarks. More particularly, the present invention relates to the generation and execution of bookmarks having one or more variables and/or commands associated therewith, thereby enabling a single bookmark to function differently in different contexts.

2. Description of the Related Art

The Internet has recently become a popular information resource for even the most unsophisticated computer user. The popularity of the Internet as an information source is due, in part, to the vast amount of available information that can be downloaded by almost anyone having access to a computer and a connection. However, the enormous amount of information that is available on the Internet can make it difficult to locate specific information on a given topic.

While the amount of information accessible via the Internet is daunting, users often return to the same website on a regular basis. In order to reduce the time it takes to access a given website, a user may choose to create a readily-accessible link to the website by adding a "bookmark" to a bookmark list. A bookmark is a saved hyperlink to a website or web page. By adding a link to a website or web page to the user's bookmark list, the user may quickly and easily return to the website or web page via the saved link.

Generally, bookmarks are "hard-coded," i.e., the bookmark executes in the same manner each time it is selected. By selecting a particular bookmark, the user is taken to the same web page every time the user selects that bookmark. The user must therefore create a new bookmark for each new location they would like to save a link to. Although existing bookmarking techniques work well, there are continuing efforts to develop improved bookmarking techniques and functionalities.

SUMMARY OF THE INVENTION

Methods and apparatus for configuring a bookmark are disclosed. The bookmark may be configured such that it has one or more variables and/or one or more commands associated therewith. With this arrangement, a bookmark may be configured to operate in a different manner depending upon the context in which it is selected.

In one aspect of the invention, a bookmark that includes a hyperlink and a variable is described. The bookmark is arranged to obtain a value for the variable when the bookmark is selected and to link to a target location identified by the hyperlink. In some embodiments, the variable is associated with the hyperlink. With this arrangement, the bookmark is arranged to link to a target location identified by the hyperlink which is based at least in part on the value obtained for the variable. This allows the same bookmark may be used to automatically redirect a user to different locations depending upon the state of the user's browser or other factors.

In some embodiments, the value obtained for the variable may be based upon current or previous web activity of a user. For instance, the searching or browsing activity of the user may be used to identify a particular website, web page, or other resource that the user previously visited. Accordingly, a user may be redirected to different websites or web pages depending upon a current location of the user or prior locations that the user had visited.

In accordance with another aspect of the invention, a bookmark may be configured to include one or more commands associated therewith. When the bookmark is selected, the command(s) of the bookmark are executed. Where a command has a variable associated therewith, the command is executed in accordance with the current value of the variable. In some embodiments, the function is performed at the target location identified by a hyperlink associated with the bookmark.

The embodiments of the invention may be implemented in software, hardware, or a combination of hardware and software. The invention can also be embodied as computer readable code on a computer readable medium. In addition, data structures disclosed are also part of the invention.

BRIEF DESCRIPTION OF THE DRAWINGS

The invention, together with further objects and advantages thereof, may best be understood by reference to the following description taken in conjunction with the accompanying drawings in which:

FIG. 8 illustrates a table of illustrative hyperlinks used in various examples in the following description.

DETAILED DESCRIPTION OF THE INVENTION

Figure 1:
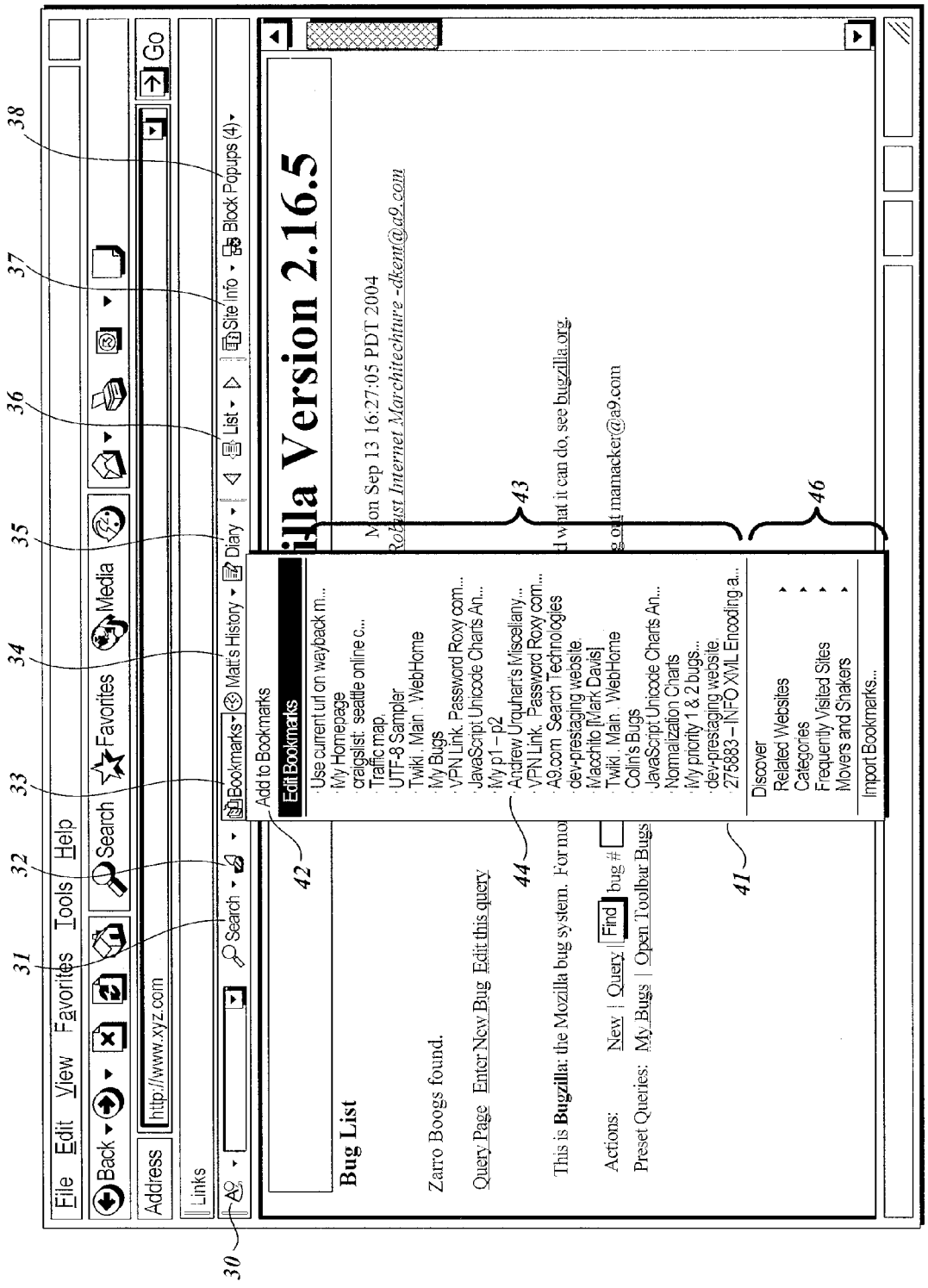
FIG. 1 is an exemplary graphical user interface that uses a toolbar to present bookmarks in accordance with one embodiment of the invention.

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

The present invention relates generally to the creation and use of configurable bookmarks. More specifically, in accordance with one embodiment, a bookmark may be configured to perform various functions and/or to perform a redirect to various locations in response to factors that are external to the bookmark. A bookmark that is configurable may include one or more commands and/or one or more variables. For instance, the same bookmark may be configured to function differently depending upon the value of one or more variables. The configuration of a bookmark may be performed either automatically by the system (e.g., a toolbar or a website) or by the user. For instance, a bookmark may be configured when the bookmark is selected.

Variables used in configurable bookmarks may take a wide variety of different forms. For example, variables may take the form of integer, float, string or other conventional computing variable constructs. A string variable may be desirable, for example, to designate a search term or phrase, thereby enabling the bookmark to perform a search for the search term or phrase when the bookmark is selected (e.g., executed). As another example, the variable may be used to designate a username or password of the user selecting the bookmark. As yet another example, the variable may designate a location (e.g., URL or portion thereof) at which the bookmark is to be executed. For instance, the variable may be a prefix or suffix (e.g., A9.co.uk) of a domain at which the bookmark is to be executed. The bookmark may be further configured with a function to be performed when the bookmark is executed. The function may be implicit in the bookmark, or may be designated by a separate command.

Various commands may also be associated with a configurable bookmark for a variety of purposes. A command may be configured to perform a particular function. Moreover, the command may be associated with a particular variable such that the command is configured to execute at a location designated by the corresponding variable (e.g., which may identify a domain, website, web page, or URL, or portion thereof). For instance, a command may perform the highlighting of a search term or phrase such as that specified in a value of a variable. As another example, the command may be configured to redirect the user to a user account at the location designated by the corresponding variable. A command may also include a conditional statement such as an IF or IF then ELSE statement, where the conditional statement enables the command to be executed if the condition of the conditional statement is satisfied. Thus, the command is not executed if the condition of the conditional statement is not satisfied. Alternatively, in the event of a conditional statement such as an IF then ELSE statement, a second command is executed when the condition of the conditional statement is not satisfied. In one embodiment, the conditional statement depends upon the content of a search term or phrase.

A wide variety of variables and/or commands may be used to implement a bookmark. In one implementation, a number of variables/commands are defined that permit a user or system administrator to create bookmarks that will function differently based upon the current state of a browser or some other resource. By way of example, in the first described embodiment, the variables/commands include: [[:URL:]], [[:ENCODEDURL:]], [[:DOMAIN:]], [[:SELECTION:]], [[:SEARCHTERMS:]], [[:SETHIGHLIGHT:<termstohighlight>]], [[:TIME:]], [[:REGVAL:<nameofregentry>:]] and [[:COOKIEVAL:<nameofcookie>:]].

The "URL" variable is arranged to get the browser's current URL (i.e., the URL of the web page that the browser is currently opened to) and plug it into the bookmark at the appropriate location. Thus, for example, if the browser is currently directed at a web page identified as "URL 2" (see FIG. 8), then "URL 2" would be inserted into the bookmark at the location identified by the URL variable. This type of functionality is useful in a number of applications. By way of example, a user may know that they are interested in seeing an earlier version of a certain web page. To help automate the process of finding these earlier versions, the user could create a bookmark to the Wayback Machine (as identified by "URL 4" of FIG. 8), which is a tool administered by the Internet Archive that permits web users to view old versions of an extremely large number of websites. To conduct a search using the Wayback Machine, a user may enter a specific URL of a particular page of interest (or the domain name of the website of interest). The Wayback Machine then provides a list that identifies versions of that particular web page (or website) that are stored in the Internet Archive. Thus, as will be described in more detail below, a bookmark to the Wayback Machine may be configured to incorporate the URL of the current browser page so that when the Wayback Machine bookmark is accessed, the browser is directed to the results page that occurs when the current URL is used as the search term in the Wayback Machine.

The "Encodedurl" variable is arranged to encode the data associated with the browser's current URL, into the bookmark. It should be appreciated by those familiar with various search technologies, a number of search engines are not able to directly handle a URL due to their particular formatting, but are able to handle encoded versions of the URL (i.e., they can handle the data within the URL but not some of its unique formatting). There are a wide variety of standard encoding formats. By way of example, several standard encoding techniques are illustrated at "URL 6" of FIG. 8. The Encodedurl variable is arranged to get the browser's current URL, encode the URL in accordance with a designated encoding technique and plug it into the bookmark at the appropriate location. This variable can be used to utilize the Current URL in bookmarks for websites that are not able to recognize standard URLs.

The "Domain" variable is arranged to obtain the domain associated with the current URL and to insert the domain segment of the current URL, into the bookmark at the location identified by the Domain variable. Using the URL example provided above, the inserted domain would be as shown in "URL 8" of FIG. 8. This type of functionality might also be useful in a wide variety of applications. Using the same example as before, if the user is interested in seeing a past version of selected websites (instead of just specific pages), the user could create a bookmark to the Wayback Machine that utilizes the Domain variable instead of the URL variable. With this arrangement, when the Wayback Machine bookmark is accessed, the browser is directed to the results page that occurs when the current domain is used as the search term in the Wayback Machine.

The "Selection" variable is arranged to take any items that the user has highlighted on the current page and insert that term or those terms into the bookmark. One example of a bookmark that is well suited to incorporate the Selection variable might be a bookmark to an on-line dictionary such as the example demonstrated by "URL 10" of FIG. 8. In this example, a bookmark to an on-line dictionary may be configured to incorporate any highlighted terms on the current browser page so that when the on-line dictionary bookmark is accessed, the browser is directed to the definition page that occurs when the highlighted term is searched. For example, if the user highlights the term "hyperlink" and selects a bookmark for an on-line dictionary, the dictionary site may return a page that provides a definition of the term "hyperlink."

The "Time" variable is arranged to insert the current time in the bookmark. By way of example, as will be appreciated by those familiar with tracking time in a computer system, one convention for measuring time in computing systems is typically referred to as Epoch time (which is measured in terms of seconds since epoch—Midnight the morning of Jan. 1, 1970.) In various applications in may be desirable to provide a timestamp as part of a bookmark access. The time variable can be used to provide such a time stamp. Of course the time may be useful in a number of other applications as well.

The "Searchterms" variable is arranged to take any terms that are provided in a search dialog box and places them into a bookmark when it is accessed. Like the previously described variables, this feature is useful in a wide variety of applications.

"Sethighlight" is a command that operates a bit differently than many of the previously described variables. This command includes a designated term or terms. When a bookmark that incorporates a "Sethighlight" command is selected, the browser will access and display the bookmarked web page and then highlight each of the designated terms within the bookmarked page. The "Sethighlight" command can be used in a wide variety of situations and is particularly useful when used in conjunction with some of the other described variables. For example, the designated terms could be provided using the Selection or Searchterm variables to give the user the ability to dynamically chose the terms that will be highlighted in the target page.

The "Regval" variable is particularly applicable to systems running the Windows Operating System. The Regval variable is arranged to obtain a specified value from the Windows OS registry and place the corresponding value in the bookmark. This feature is particularly useful in the creation of server-generated bookmarks and permits such bookmarks to be customized to the settings of a particular user's machine.

The "Cookieval" variable is somewhat similar to the Regval variable. However, it is arranged to obtain a value from a cookie and places the obtained value in the bookmark. Like the Regval variable, this can be a particularly useful tool in the creation of server-generated bookmarks. For example, it is common to change the URL associated with various web pages and/or various content posted on a website and/or services provided by a website. If a user bookmarks a particular web page and its URL subsequently changes, the bookmark traditionally becomes useless (or at least less useful), unless the web page at the targeted URL is arranged to redirect traffic to the new page. The "Cookieval" variable can be used to allow the provider to automatically update bookmarks directed at the targeted web page. The Cookieval variable can be used in a wide variety of other applications as well. For example, a software or website developer may have a number of testers that have agreed to help test or review their new software or website products. Often, the users are provided a URL at which they can access a new product to be tested or reviewed. The Cookie variable can be incorporated into bookmarks that reference the test access site. Using this approach, the developer can immediately update bookmarks that reference the test access site with the URL that the developer wants the testers/reviewers to access by simply changing the value stored in a cookie and without needing to burden the testers/reviewers with repeated updates.

Referring now to FIGS. 1-4, an interface for creating configurable bookmarks will be briefly described. FIG. 1 generally illustrates a toolbar-based interface for displaying bookmarks. In this embodiment, a toolbar 30 has a number of buttons 31-38 that represent different functionalities that can be performed by the toolbar. The bookmarks are presented in a pull-down menu 41 that is accessed by selecting bookmarks button 33. The pull-down menu 41 includes a bookmark section 43 and a recommended links section 46. The bookmark section 43 includes an Edit Bookmarks entry 42, and a number of bookmarks 44 that have been saved by the user. In the illustrated embodiment, the bookmark section 43 is presented as a series of hyperlinks to sites that have been saved by the user. In other embodiments, hierarchical folders may be used to store some or all of the bookmarks. The bookmarks 44 may include both configurable bookmarks and conventional bookmarks.

Figure 2:
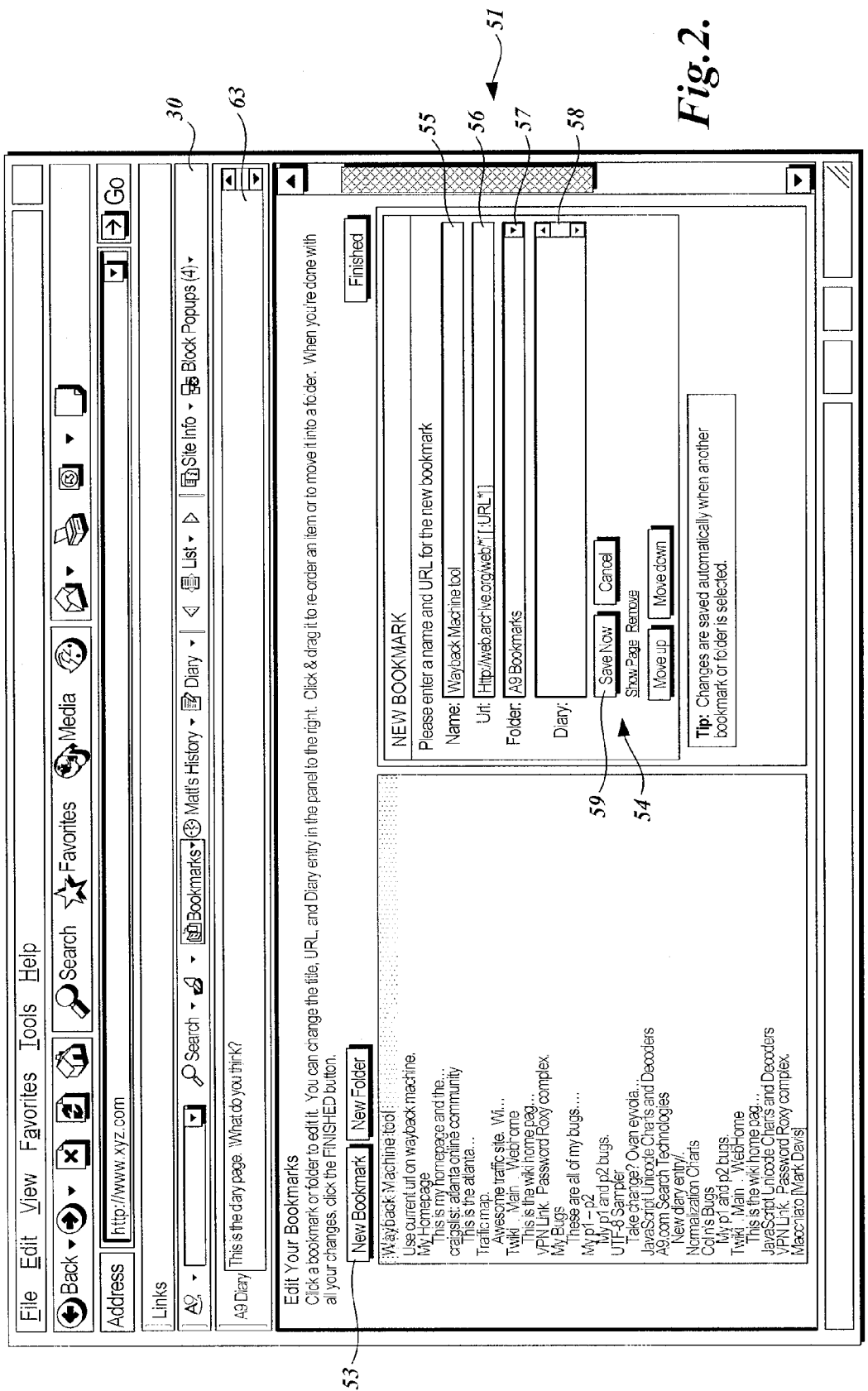
FIG. 2 is an exemplary graphical user interface illustrating the dialog box that appear when a user selects the Edit bookmark link in FIG. 1 and subsequently begins to create a new bookmark in accordance with one embodiment of the invention.

A user may create or edit a particular bookmark by first selecting the Edit Bookmark entry 42 in the menu. This may prompt a bookmark editing page 51 to be displayed that looks much like the left side of FIG. 2. In that state, the user may create a new bookmark by selecting the New Bookmark button 53. Selection of the New Bookmark button causes the page illustrated in FIG. 2 to be displayed. As depicted in FIG. 2, the page includes a New Bookmark Dialog box 54. The New Bookmark Dialog box 54 allows a user to enter a configurable URL and other appropriate information to create a new configurable bookmark. The New Bookmark Dialog box includes a "Name" field 55, a "URL" field 56, a "Folder" field 57 and a "Diary" field 58. The Name field 55 permits a user to enter a short name that identifies the new bookmark. The name will be used as the text that appears in the bookmark entry corresponding to the newly created bookmark. The URL field is used to receive the URL of the targeted website. A unique aspect of the URL field 56 is that the URL typed into the URL field may include any variables and/or commands that are supported by the system.

In this example, the text that has been entered into URL field 56 is illustrated as "URL 12" of FIG. 8. In "URL 12," the text denotes the use of the URL variable described above. As such, this variable is arranged to get the browser's current URL when the bookmark is eventually selected and incorporate that into the URL that is accessed by the bookmark. The particular URL entered in the URL field 56 is arranged to access the Wayback Machine (which is identified by the portion of the URL entry as identified by "URL 14" of FIG. 8) and return the results of a search using the referenced URL (i.e., the URL of the current page when the Wayback Machine bookmark is selected).

The Folder field 57 indicates the folder (if any) within the bookmark section of bookmark menu 41 in which the newly created Wayback Machine bookmark will be stored. If no folder is referenced, the newly created bookmark will be stored in the top level of the bookmark section of bookmark menu 41. The Diary field 59 allows the bookmark creator to enter comments about the bookmark that would appear in the Diary box 63 of tool bar 30 when the bookmark is selected.

The New Bookmark Dialog box 54 also includes a Save button 59 that allows a user to save and install the newly created (or edited bookmark).

Figure 3:
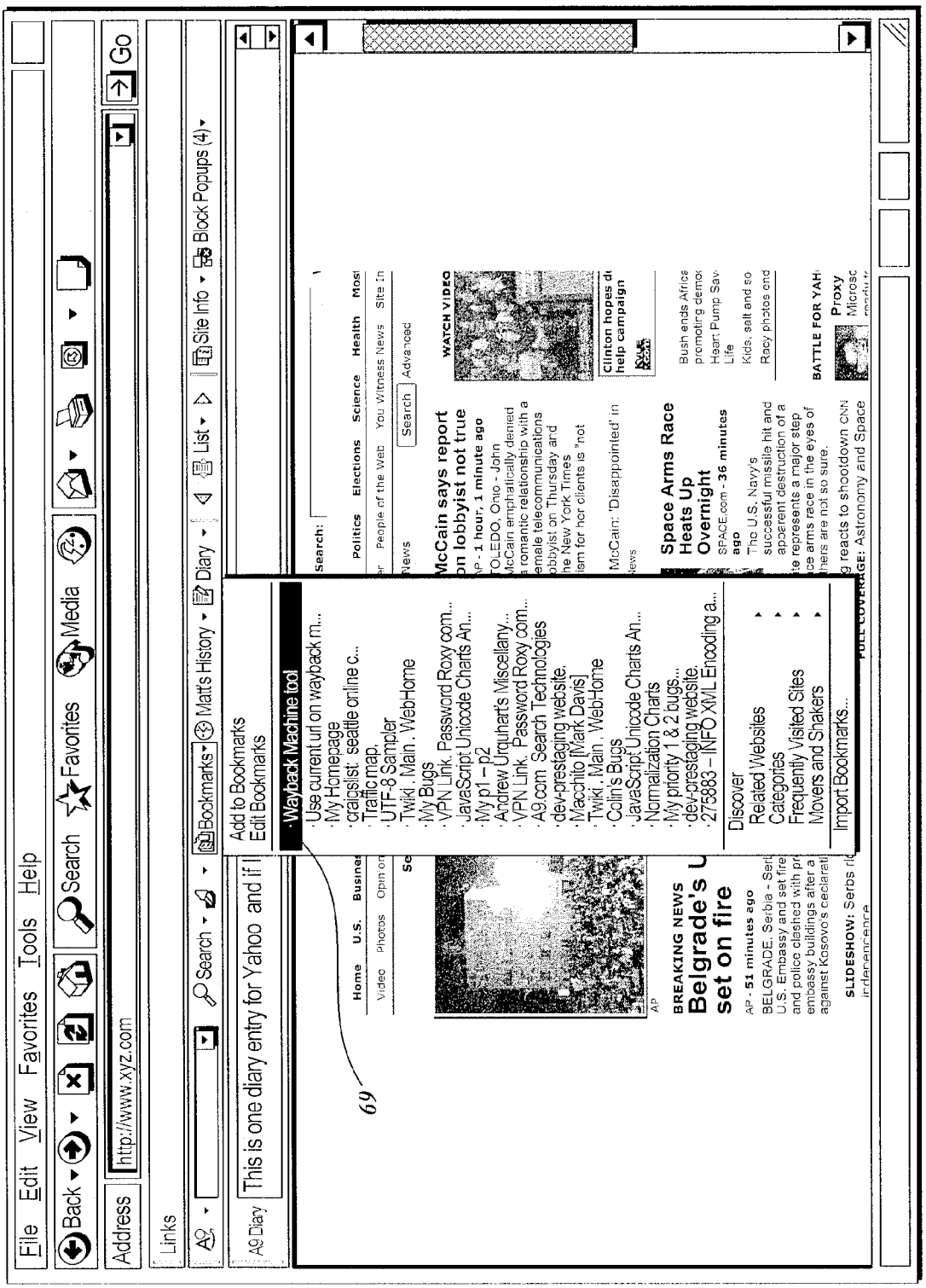
FIG. 3 is an exemplary graphical user interface illustrating the toolbar of FIG. 1 after a new configurable bookmark has been added.
Figure 4:
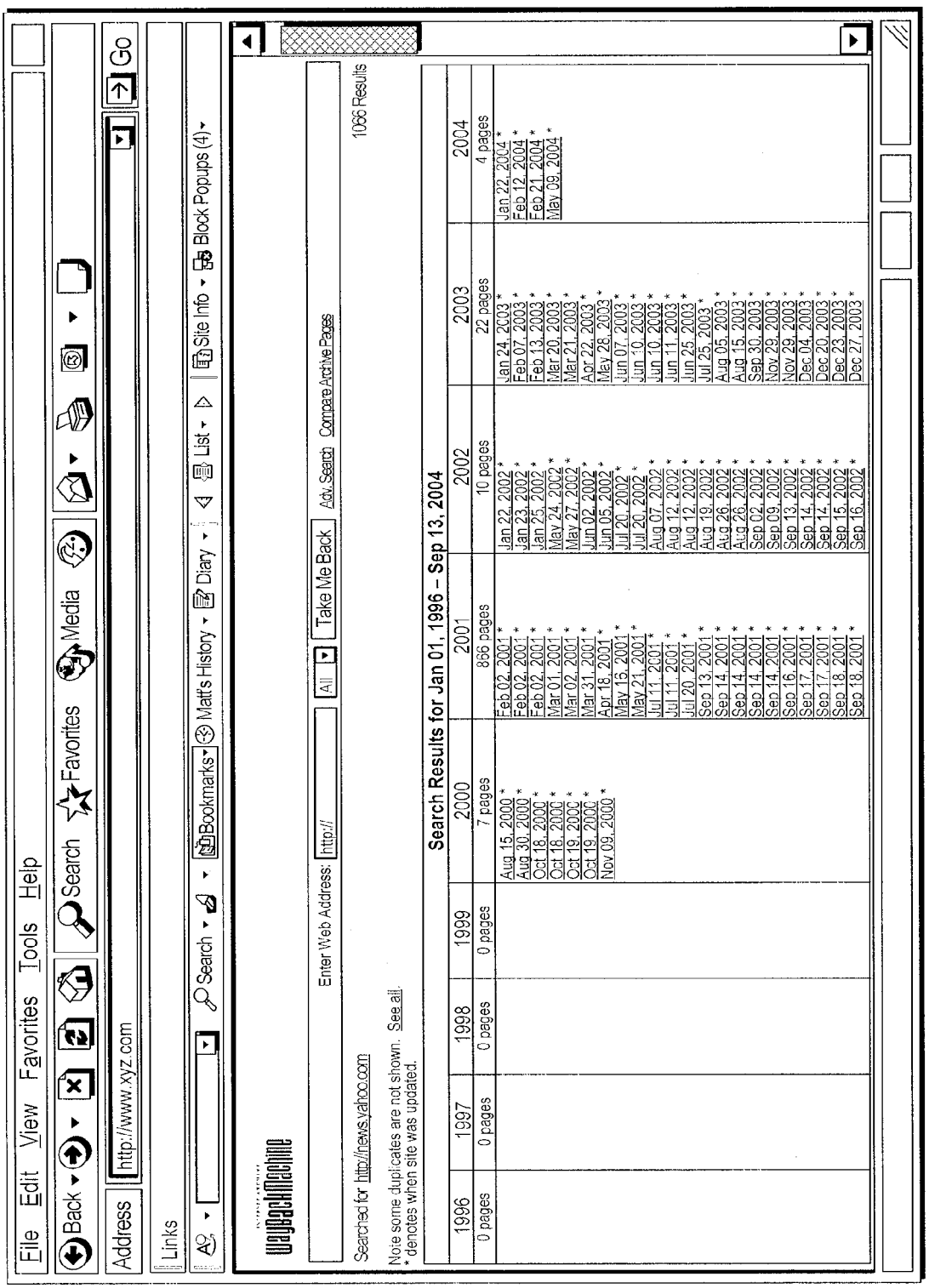
FIG. 4 is an exemplary graphical user interface illustrating the results of selecting the newly created bookmark illustrated in FIG. 3.

A representative usage of the newly created bookmark is illustrated in FIGS. 3 and 4. As can be seen by comparing FIG. 3 to FIG. 1, a new bookmark 69 entitled Wayback Machine Tool has been added to the bookmark list. As can be seen in the background portion of FIG. 3, the current page in the illustrated state is represented as "URL 16" of FIG. 8.

Therefore, when the bookmark 69 is selected, the toolbar links to the Wayback Machine using the configured URL provided earlier in the URL field 56 of the New Bookmark Dialog Box 54. The URL of the current page (i.e., "URL 16" of FIG. 8) then becomes a part of the bookmark's URL hyperlink. Accordingly, as can best be seen by reference to FIG. 4, the selection of the Wayback Machine bookmark 69 causes the Wayback Machine to return the results of an archive search for the "URL 16."

Figure 6:
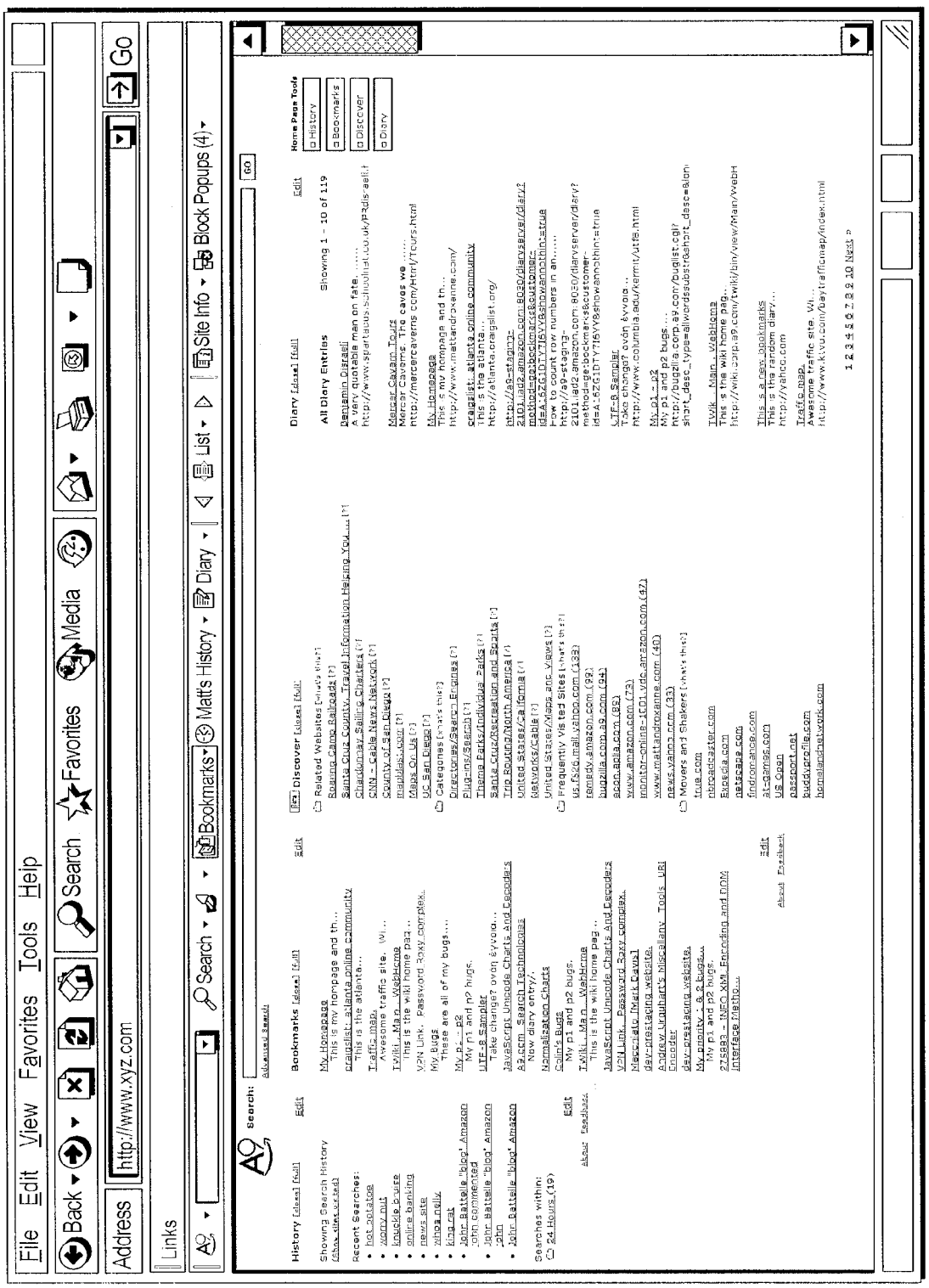
FIG. 6 is an exemplary graphical user interface that uses a web page to present bookmarks in accordance with another embodiment of the invention.

Various interfaces may be presented to a user to enable the user to access, create or edit a bookmark. As described above, FIG. 1 illustrates a toolbar-based interface for displaying bookmarks and accessing the bookmark editing page. In other embodiments, a web page such as the interface presented in FIG. 6 can be used to display bookmarks and access the bookmark editing page. FIG. 2 illustrates an interface for entering new bookmarks. Substantially the same interface can also be used to edit existing bookmarks. It should be appreciated that both standard bookmarks and configured bookmarks can be created and/or edited using the described interfaces.

Figure 5:
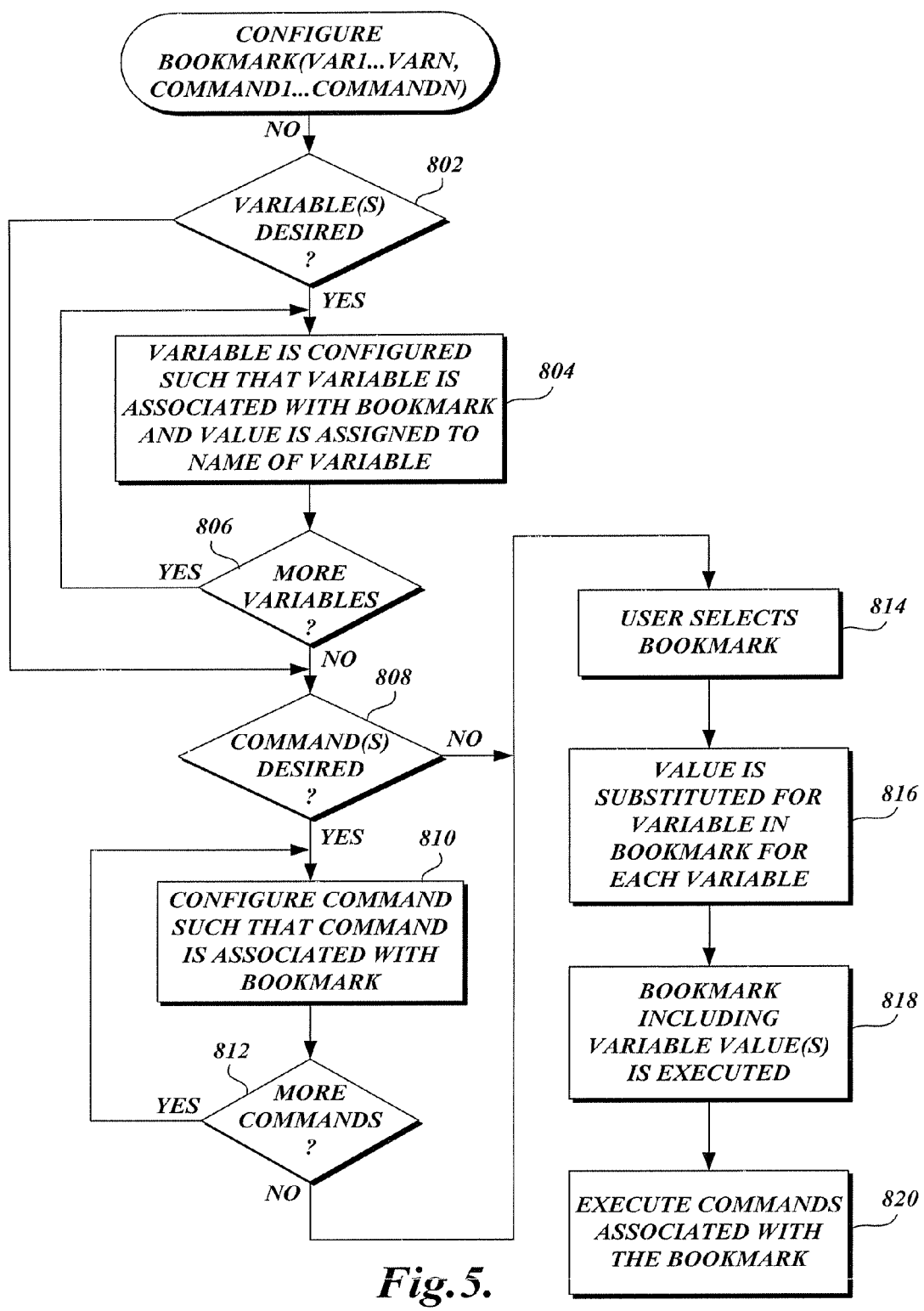
FIG. 5 is a process flow diagram illustrating a method of configuring and selecting a bookmark in accordance with one embodiment of the invention.

Referring next to FIG. 5, a method of configuring and selecting a bookmark in accordance with one embodiment of the invention will be described. As described above, a bookmark may include one or more variables and/or one or more commands. As shown in FIG. 5, if one or more variables are desired at block 802, a variable is configured such that it is associated with the bookmark at block 804, enabling a value to be assigned to the variable. A variable may be associated with a bookmark automatically via selection of a particular bookmark from a list of bookmarks. Alternatively, a variable may be selected by the user from a plurality of selectable variables.

In accordance with one embodiment, a value may be assigned to a variable automatically by the system such as via a website, toolbar, or software application (e.g., during runtime). As one example, the value may be automatically assigned to the variable upon selection by the user of the variable or bookmark. For instance, the value may be obtained from previous web activity (e.g., previous location, search or browsing activity, or purchase activity) as well as current activity (e.g., current location) of the user selecting the bookmark. As a result, the value of the variable may correspond to a domain, website, web page, or URL, thereby enabling the bookmark when selected to redirect the user to the domain, website, web page, or URL defined by the value of the variable. For instance, the inserted domain, website, web page, or URL may be the domain, website, web page or URL that was last visited by a user selecting the bookmark. Similarly, the domain, website, web page, or URL may be a current location of a user selecting the bookmark. Thus, the value assigned to the variable may be a domain, website, web page, or URL (or portion thereof). Moreover, as set forth above, the value of the variable may be assigned a particular search term or phrase (e.g., electronics) that is commonly searched for by the user, thereby enabling the history of the user to simplify the searching process for the user upon execution of a command configured to initiate a search for the designated search term or phrase (or suggest a recommended search term or phrase, which may be executed or altered by the user).

Alternatively, the assignment of a value to a variable may be performed by the user. For instance, the user may select the value from multiple selectable values that are presented as part of a user interface that is presented when a bookmark is selected. As one example, consider a situation where an entity has information that is specific to several different members of a family. There are a wide variety of such situations. For example, a school may have information about several different children who attend the school, an airline may have account information (e.g. a mileage account) for each member of the family, a web activity tracking service may tract the browsing habits of a several different family members that use the same computer, a telecommunication company may have billing information for several different phones, etc. If such information is available on-line, a parent may wish to view information associated with a particular family member (e.g. child) or a particular account.

In a situation where a school has a website that allows parents to access information about their children, and a family has multiple children attending the school, a bookmark to the school may be designed to have a variable that identifies a particular student. More specifically, a bookmark having a variable corresponding to a child's name and/or student ID may be configured such that when it is selected, a menu appears that identifies each of the children in the family that are attending the school. Thus, when the bookmark is selected, a menu appears that provides a list of that parent's children attending the school. The parent may then select the child's name from the multiple name's presented. When a particular child is chosen, the bookmark will link to the desired site presenting the selected child's identifier as the variable. The target web site can then be arranged to present information that is relevant to the identified student.

Similarly, in a corporate environment, it may be desirable to access contact information or status information (e.g., billing status information) associated with a customer, supplier or client. A bookmark to a company's A/R status check page within its own intranet may use a variable to identify the entity whose A/R report is desired. When the bookmark is selected, a prompt may be presented that permits the user to enter the name or identifier associated with the specific customer (or other entity) for which information is sought.

In another application, a bookmark may be customized to the web activity of the user. In such a scenario, the bookmark may direct the user to different websites or web pages based upon the state of the user. For instance, a bookmark having a variable may be used to redirect the user to the user's account at the user's current location. Thus, when the user selects the bookmark when on the Amazon site, the bookmark may redirect the user to the user's Amazon account page. When the user selects the same bookmark when on an A9.com site, the bookmark may redirect the user to the user's A9 account page.

In addition, it may be desirable to parse a URL to obtain a segment of the URL to be used as the value of the variable. As set forth above, the URL may be a URL that has previously been accessed by a user selecting the bookmark, or may be a URL that is currently accessed by the user selecting the bookmark. By parsing this URL, the segment may be obtained and assigned to the variable. For instance, the segment of the URL may identify a prefix or suffix of a domain or a web site. As another example, it may be desirable to identify a numerical portion or a word in the URL.

Moreover, it may be desirable to pull the value of the variable from data of a web page previously or currently visited. For instance, the data may be a number, word or phrase. Thus, various algorithms may be implemented to search a web page for a desired numerical or textual value.

It may also be desirable to obtain the value of the variable from a search box. For instance, a user selecting the bookmark may enter one or more search terms or phrases, which the user may choose to highlight on a particular web page. These search terms or phrases may then be substituted for the value of the variable upon execution of the bookmark.

Alternatively, the value may be assigned to the variable automatically upon selection of a command configured to assign a value to the variable of the bookmark such that a name-value pair is generated. This process is repeated at block 806 for all desired variables as shown at block 802.

Upon configuration, the value may be stored such that it is associated with the corresponding variable. In accordance with one embodiment, each variable and its associated value are stored as a name-value pair upon configuration. This name-value pair may be stored at the user's machine (e.g., in a cookie or Windows registry) or at a server such as that supporting the central website via which the bookmark is configured. The "Regval" and "Cookieval" variable examples described above are good examples of such an arrangement. Specifically, the "Regval" variable is arranged to obtain a specified value from the Windows OS registry and place the corresponding value in the bookmark. The "Cookieval" variable is arranged to obtain a value from a cookie and place the obtained value in the bookmark.

If one or more commands are desired at block 808, a command is configured such that it is associated with the bookmark at block 810. A command may also be associated with a bookmark via selection of a particular bookmark from a list of bookmarks, which may include one or more commands. By associating a command with the bookmark, the command may be executed upon execution of the bookmark.

Selection of a command or association of a command with a bookmark may be performed by the user or by the system such as via a website or toolbar (e.g., at run-time). For instance, the user may select the command from multiple selectable commands. Alternatively, the command may be associated with the bookmark automatically by a toolbar, website or software application upon selection by the user of the bookmark. For instance, the command may be selected based upon previous web activity (e.g., previous location, search, browsing activity, or purchase history) as well as current activity (e.g., current location) of the user selecting the bookmark. As a result, the command may correspond to a domain, website, web page, or URL, thereby enabling the bookmark when selected to go to the domain, website, web page, or URL corresponding to the command. For instance, the domain, website, web page, or URL may be that previously or last visited by a user selecting the bookmark. Similarly, the domain, website, web page, or URL may be a current location of a user selecting the bookmark. The command may then be executed at the corresponding location (e.g., domain, website, web page, or URL), which may be a location designated by a corresponding variable, as described above. This process is repeated at block 812 for all desired commands as shown at block 808.

An example of a bookmark that uses both variables and commands might be a bookmark configured with "URL" and "selection" variables (as described above) in combination with the "Sethighlight" command described above. Such a bookmark could be configured to highlight all occurrences of a selected word in the current page or document. Another example might be a bookmark configured to automatically log-in to a designated website followed by the execution of one or more particular commands at the designated web site. Of course, it should be appreciated that the number of applications that configurable bookmarks having both commands and variables can be used in is virtually endless.

Once a bookmark has been configured, the bookmark may be selected by a user at block 814. At that time, the value associated with each corresponding variable may be retrieved from memory, as appropriate. The value is then substituted for the corresponding variable of the bookmark for each variable at block 816. Specifically, the substitution of values for the corresponding variables may be performed automatically when the bookmark is selected, thereby enabling the value(s) to be substituted for the variable(s) of the bookmark at runtime. The bookmark including the variable value(s) is then executed at block 818. At that time, any command(s) associated with the bookmark are executed at block 820, which may also cause one or more variables to be substituted as set forth above.

It is important to note that the user that is selecting the bookmark may be the user responsible for configuring the bookmark. However, the configuration of the bookmark may also be performed by a different user, such as an administrator.

Although specific embodiments of the configurable bookmarks have been described in detail, it should be apparent that other types of configurable bookmarks may be generated to create a wide variety of useful bookmarks.

Figure 7:
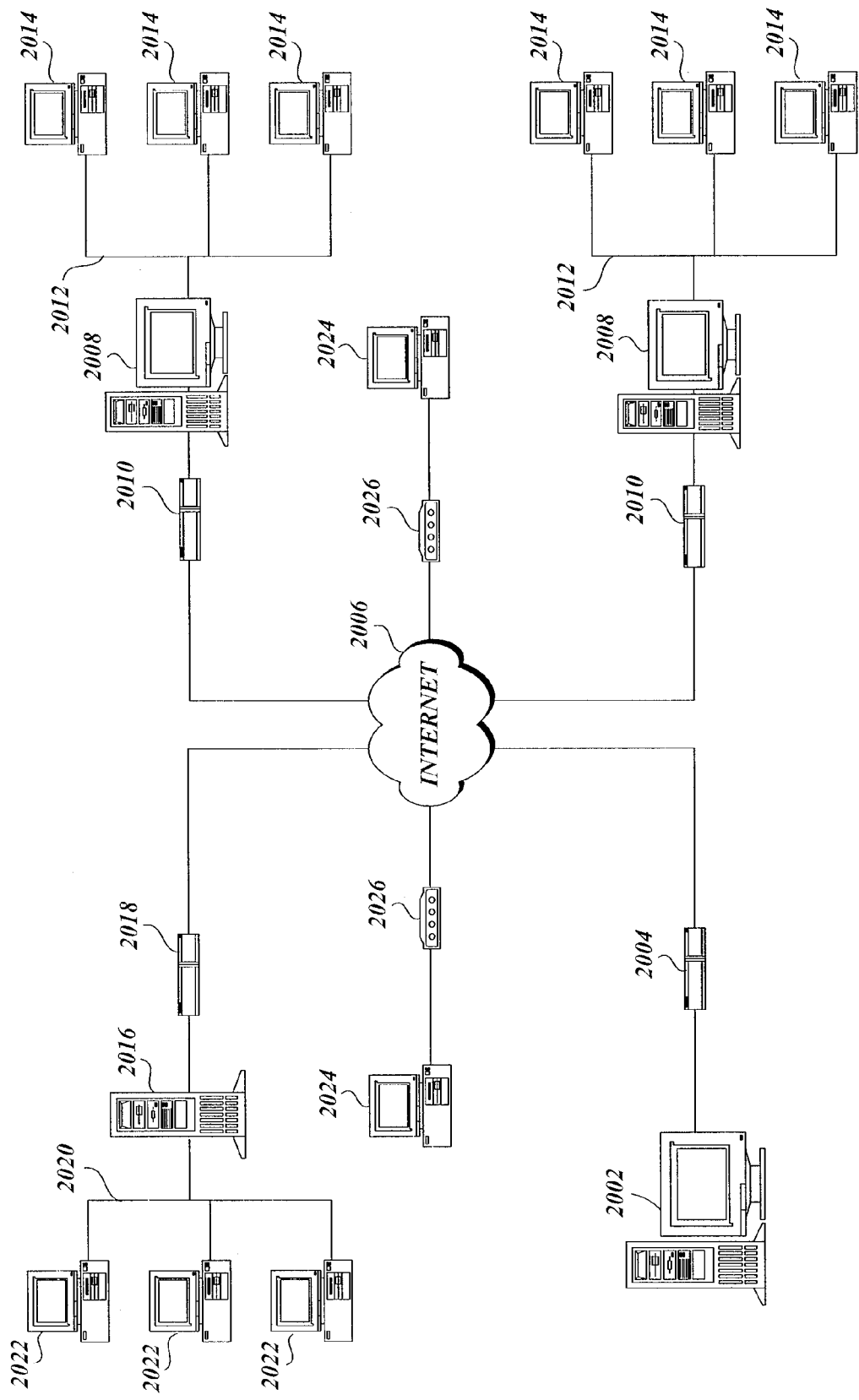
FIG. 7 is a diagram illustrating an exemplary system in which the present invention may be implemented.

FIG. 7 is a block diagram of a hardware environment in which the various embodiments of the present invention may be implemented. The website at which data is collected, stored, retrieved, and analyzed in order to generate lists of recommended links is located on a server 2002 which is connected by a router 2004 to the Internet 2006. Users located at businesses (represented by servers 2008) may also be connected to the Internet via routers 2010 in order to receive the transmission of one or more lists of recommended links from the server 2002. Business servers 2008 may have networks 2012 associated therewith interconnecting a plurality of personal computers or workstations 2014. Users (represented by computers 2022 and 2024) may be connected to the Internet in a variety of ways. For example, a user may be connected from his home via a modem 2026, or from his workplace via a network 2020, a file server 2016, and a router 2018. As described above, a different toolbar identifier may be associated with each computer that the user accesses. It is therefore possible to separately track a user's web activities occurring at home and work. It will be understood that, according to various embodiments of the invention, users may gain access to the website on server 2002 via a variety of hardware configurations. Similarly, businesses may be coupled to the website on server 2002 in order to receive the transmission of communications as well as data from the website. For example, a business may consist of an individual on his home computer 2024. Similarly, a user may be an employee who accesses the website from his computer 2014 at his place of employment, which is a business. It will also be understood that the hardware environment of FIG. 7 is shown for illustrative purposes and that a wide variety of hardware environments may be employed to implement the various embodiments of the present invention. It should also be understood that specific embodiments of the methods and processes described herein are implemented as computer program instructions, i.e., software, in the memory of server 2002. In addition, the disclosed embodiments may be implemented in a peer-to-peer or other distributed system.

Various embodiments of the invention can also be embodied as computer readable code on a computer readable medium. The computer readable medium is any data storage device that can store data, which can thereafter be read by a computer system. Examples of the computer readable medium include read-only memory, random-access memory, CD-ROMs, magnetic tape, and optical data storage devices.

Although illustrative embodiments and applications of this invention are shown and described herein, many variations and modifications are possible which remain within the concept, scope, and spirit of the invention, and these variations would become clear to those of ordinary skill in the art after perusal of this application. For example, although only a very few examples have been provided that illustrate potential uses of configurable bookmarks, it should be apparent that the described constructs provide very powerful tools that can be used in a wide variety of applications that extend well beyond the described uses. It is expected that creative programmers may be able to use the described variables and commands in a wide variety of applications and that any number of other variables and commands can be developed that can serve as useful tools. Accordingly, the present embodiments are to be considered as illustrative and not restrictive, and the invention is not to be limited to the details given herein, but may be modified within the scope and equivalents of the appended claims.

The invention claimed is:

1. A computer-readable storage medium comprising instructions for:
creating a bookmark for use in a browsing environment, wherein the bookmark includes an HTTP protocol Uniform Resource Locator hyperlink to content at a first document location, the Uniform Resource Locator hyperlink including a variable portion that corresponds to a value such that when the bookmark is selected the value is substituted for the variable portion and included as part of the hyperlink, and wherein the variable portion of the bookmark corresponds to a cookie value received from a content provider, said cookie value indicating a new document location different than the first document location; and
responsive to selection of the bookmark, identifying to the new document location a function for highlighting a term or phrase of a web page of the new document location, the function for highlighting the term or phrase to be performed by the new document location.

2. The computer-readable storage medium as recited in claim 1 wherein the variable portion of the bookmark corresponds to a value comprising one of a current URL associated with the browsing environment, a domain associated with the current URL, and an encoded version of the current URL.

3. The commuter-readable storage medium as recited in claim 1 wherein the variable portion of the bookmark corresponds to a value comprising a current time.

4. The computer-readable storage medium as recited in claim 1 wherein the variable portion of the bookmark corresponds to a value that is selected in a current page that is open in the browsing environment.

5. The computer-readable storage medium as recited in claim 1 wherein the variable portion of the bookmark, when the bookmark is selected, includes a value that has been entered as a search term into a search field of an accessed page.

6. The computer-readable storage medium as recited in claim 1, wherein the variable portion identifies a username or password of a user selecting the bookmark.

7. A commuter-readable storage medium comprising instructions for:
creating a bookmark for use in a browsing environment, wherein the bookmark is an HTTP Uniform Resource Locator hyperlink to a first document location, the bookmark having a variable portion corresponding to a cookie value received from a content provider, said cookie value indicating a new document location different than the first document location, wherein the variable portion substituted by the cookie value when the bookmark is selected; and
responsive to selection of the bookmark, identifying to the new document location a function for highlighting a term or phrase of a web page of the new document location, the function for highlighting the term or phrase to be performed by the new document location.

8. A method of executing a bookmark, comprising:
under the control of one or more computer systems configured with executable instructions,
receiving a selection of a bookmark, wherein the bookmark includes a hyperlink including a first Uniform Resource Locator indicating a location of a previously-visited page of a content provider; and
in response to receiving selection of the bookmark:
receiving a cookie from the content provider, the cookie including a cookie value corresponding to a new Uniform Resource Locator;
updating the bookmark to include the new Uniform Resource Locator;
indicating to a server associated with the new Uniform Resource Locator a function for highlighting a term or phrase of content corresponding to the new Uniform Resource Locator; and
causing the content corresponding to the new Uniform Resource Locator to be displayed.

9. The method as recited in claim 8, wherein the bookmark includes a variable that identifies a command executed upon selection of the bookmark.

10. The method as recited in claim 8, wherein the bookmark includes a variable that identifies a domain, a URL or a portion of a URL associated with a current browsing location at the time the bookmark is selected.

11. The method of claim 8, wherein said updating includes replacing the first Uniform Resource Locator with the new Uniform Resource Locator.

12. A method comprising:
under the control of one or more computer systems configured with executable instructions,
creating an HTTP protocol Uniform Resource Locator bookmark that includes a variable hyperlink;
receiving a selection of the bookmark; and
in response to receiving selection of the bookmark:
obtaining a value for the variable hyperlink of the bookmark in response to the selection of the bookmark, the value being derived from a cookie received from a content provider and indicating a target location; and
linking to the target location identified by the variable hyperlink; and
identifying to the target location a function for highlighting a term or a phrase of web page content of the target location, the function for highlighting the term or phrase to be performed by the target location.

13. The method as recited in claim 12, wherein the bookmark comprises a plurality of variables, and wherein the method further comprises:
repeating the obtaining step for a plurality of variables of the bookmark such that a value is obtained for each of the plurality of variables;
wherein when the bookmark is selected, the corresponding value is substituted for each of the plurality of variables of the bookmark.

14. The method as recited in claim 12, wherein the variable hyperlink identifies a search term or phrase, wherein selection of the bookmark causes performance of a search for the search term or phrase when the bookmark is executed.

15. The method as recited in claim 12, wherein the variable hyperlink identifies an individual or a group of individuals.

16. The method as recited in claim 12, wherein the variable hyperlink identifies a username or password of a user selecting the bookmark.

17. The method as recited in claim 12, further comprising:
obtaining a current or previous URL accessed by a user selecting the bookmark;
parsing the current or previous URL to obtain a segment of the URL, and wherein the value of the variable hyperlink includes the obtained segment of the URL.

18. The method as recited in claim 12, wherein a portion of the variable hyperlink corresponds to data obtained from the web page.

19. The method as recited in claim 18, wherein the data is highlighted by a user.

20. The method as recited in claim 12, wherein the bookmark includes a current time.

21. A method comprising:
   under the control of one or more computer systems configured with executable instructions,
      creating an HTTP protocol URL bookmark that includes a hyperlink portion and a command portion;
      receiving a selection of the bookmark; and
      in response to the selection of the bookmark:
         obtaining for a variable portion of the bookmark a cookie value derived from a cookie received from a content provider;
         updating the variable portion of the bookmark to link to a target location specified by the cookie;
         retrieving web page content available at the target location;
         identifying to the target location a function for highlighting a term or a phrase on the web page content, the function for highlighting the term or phrase to be performed by the target location.

22. The method as recited in claim 21, wherein the variable portion additionally indicates a term or phrase to be highlighted on the web page.

23. A computer-readable storage medium comprising instructions for:
   creating a bookmark for use in a browsing environment, wherein the bookmark includes an HTTP protocol Uniform Resource Locator hyperlink that includes a variable portion that corresponds to a value such that when the bookmark is selected, the value is substituted for the variable portion and included as part of the hyperlink, and wherein the variable portion of the bookmark at least corresponds to a value from a cookie received from a content provider, said cookie specifying an updated target location to be included in the bookmark such that, upon a subsequent selection of the bookmark, content will be retrieved from the updated target location; and
   responsive to selection of the bookmark, identifying to the new document location a function for highlighting a term or phrase of a web page of the new document location, the function for highlighting the term or phrase to be performed by the new document location.

24. The computer-readable storage medium as recited in claim 23 wherein the variable portion of the bookmark corresponds to a value comprising one of a current URL associated with the browsing environment, a domain associated with the current URL, and an encoded version of the current URL.

25. The computer-readable storage medium as recited in claim 23 wherein the variable portion of the bookmark corresponds to a value that is selected in a current page that is open in the browsing environment.

26. The computer-readable storage medium as recited in claim 23 wherein the variable portion of bookmark corresponds to a value that has been entered as a search term.

27. The computer-readable storage medium as recited in claim 23 wherein the variable portion identifies a username or password of a user selecting the bookmark.

\* \* \* \* \*

UNITED STATES PATENT AND TRADEMARK OFFICE
CERTIFICATE OF CORRECTION

| | | |
|---|---|---|
| PATENT NO. | : 7,783,979 B1 | Page 1 of 1 |
| APPLICATION NO. | : 11/097362 | |
| DATED | : August 24, 2010 | |
| INVENTOR(S) | : Jonathan A. Leblang et al. | |

It is certified that error appears in the above-identified patent and that said Letters Patent is hereby corrected as shown below:

In the Claims

Column 11, line 32, please delete "commuter", and insert --computer--;

Column 11, line 47, please delete "commuter", and insert --computer--;

Signed and Sealed this
Twenty-first Day of June, 2011

David J. Kappos
*Director of the United States Patent and Trademark Office*